(12) United States Patent
Schluge

(10) Patent No.: US 10,407,962 B2
(45) Date of Patent: Sep. 10, 2019

(54) ACTUATING DRIVE FOR FURNITURE FLAPS

(71) Applicant: Julius Blum GmbH, Hoechst (AT)

(72) Inventor: Philip Schluge, Dornbirn (AT)

(73) Assignee: JULIUS BLUM GMBH, Hoechst (AT)

( * ) Notice: Subject to any disclaimer, the term of this patent is extended or adjusted under 35 U.S.C. 154(b) by 449 days.

(21) Appl. No.: 15/335,680

(22) Filed: Oct. 27, 2016

(65) Prior Publication Data

US 2017/0044812 A1 Feb. 16, 2017

Related U.S. Application Data

(63) Continuation of application No. PCT/AT2015/000040, filed on Mar. 12, 2015.

(30) Foreign Application Priority Data

May 2, 2014 (AT) .................................. A 322/2014

(51) Int. Cl.
- *E05F 1/10* (2006.01)
- *E05F 5/02* (2006.01)
- *F16H 21/44* (2006.01)

(52) U.S. Cl.
CPC .............. *E05F 1/1058* (2013.01); *E05F 5/02* (2013.01); *F16H 21/44* (2013.01);
(Continued)

(58) Field of Classification Search
CPC ..... E05F 1/1058; E05F 1/1041; E05F 1/1261; E05D 15/262

See application file for complete search history.

(56) References Cited

U.S. PATENT DOCUMENTS

| 5,409,308 A * | 4/1995 | Reuter .................... E05D 15/40 |
| | | 16/289 |
| 5,882,099 A * | 3/1999 | Salice ................... E05D 15/262 |
| | | 160/207 |

(Continued)

FOREIGN PATENT DOCUMENTS

| CN | 101809245 | 8/2010 |
| CN | 102405327 | 4/2012 |

(Continued)

OTHER PUBLICATIONS

Search Report dated Jul. 13, 2017 in corresponding Chinese Application No. 2015800222264.

(Continued)

*Primary Examiner* — Kimberley S Wright
(74) *Attorney, Agent, or Firm* — Wenderoth, Lind & Ponack, L.L.P.

(57) ABSTRACT

An actuating drive for moving a flap includes a housing, an actuating arm pivotably mounted on or in the housing for the moving flap, a spring apparatus for applying force to the actuating arm, a transmission mechanism for transmitting a force of the spring apparatus onto the actuating arm, an adjusting apparatus by which a lever geometry of the transmission mechanism and/or the force of the spring apparatus, which force acts on the actuating arm, can be variably adjusted, and a damping apparatus by which a movement of the actuating arm can be damped by a damping power in the event of a damping stroke. The adjusting apparatus is coupled to the damping apparatus by a coupling apparatus, and the position of the damping apparatus relative to the housing, the damping stroke of the damping apparatus, and/or the damping power of the damping apparatus can be variably adjusted.

12 Claims, 6 Drawing Sheets

(52) U.S. Cl.
CPC ... *E05Y 2201/492* (2013.01); *E05Y 2201/618* (2013.01); *E05Y 2201/696* (2013.01); *E05Y 2600/12* (2013.01); *E05Y 2600/20* (2013.01); *E05Y 2600/30* (2013.01); *E05Y 2800/73* (2013.01); *E05Y 2900/20* (2013.01)

(56) References Cited

U.S. PATENT DOCUMENTS

| | | | | |
|---|---|---|---|---|
| 6,367,123 | B1* | 4/2002 | Cheal | E05D 3/145 |
| | | | | 16/289 |
| 6,442,799 | B1* | 9/2002 | Duarte | E04H 4/084 |
| | | | | 16/277 |
| 6,877,830 | B2* | 4/2005 | Salice | E05D 15/262 |
| | | | | 312/319.2 |
| 7,197,790 | B1* | 4/2007 | Edmondson | E05D 3/16 |
| | | | | 16/286 |
| 7,448,703 | B2* | 11/2008 | Kung | E05D 15/262 |
| | | | | 162/286 |
| 7,797,796 | B2* | 9/2010 | Migli | E05D 15/46 |
| | | | | 16/286 |
| 7,976,079 | B2* | 7/2011 | Hirtsiefer | E05D 3/14 |
| | | | | 16/286 |
| 8,303,055 | B2* | 11/2012 | Scheffknecht | E05D 15/262 |
| | | | | 312/319.6 |
| 8,321,996 | B2 | 12/2012 | Hirtsiefer | |
| 8,807,670 | B2* | 8/2014 | Blum | E05F 1/1276 |
| | | | | 16/286 |
| 9,140,289 | B2* | 9/2015 | Sutterluetti | E05D 5/02 |
| 9,277,817 | B2* | 3/2016 | Blum | E05F 1/1276 |
| 2001/0039762 | A1* | 11/2001 | Giovannetti | E05F 1/1091 |
| | | | | 49/246 |
| 2005/0242593 | A1* | 11/2005 | Migli | E05C 19/022 |
| | | | | 292/220 |
| 2006/0174444 | A1* | 8/2006 | Giovannetti | E05D 15/262 |
| | | | | 16/354 |
| 2006/0284530 | A1* | 12/2006 | Hollenstein | E05F 1/1058 |
| | | | | 312/327 |
| 2007/0124893 | A1* | 6/2007 | Brustle | E05F 1/1075 |
| | | | | 16/296 |
| 2008/0048538 | A1* | 2/2008 | Karg | E05F 1/1066 |
| | | | | 312/319.2 |
| 2008/0196203 | A1* | 8/2008 | Giovannetti | E05D 3/14 |
| | | | | 16/239 |
| 2010/0162847 | A1 | 7/2010 | Gassner | |
| 2011/0068669 | A1 | 3/2011 | Hollenstein | |
| 2012/0032570 | A1 | 2/2012 | Friesenecker et al. | |
| 2012/0161598 | A1* | 6/2012 | Blum | E05F 1/1276 |
| | | | | 312/319.2 |
| 2012/0181124 | A1 | 7/2012 | Yamaguchi | |
| 2014/0317883 | A1 | 10/2014 | Baldreich | |
| 2014/0319987 | A1* | 10/2014 | Blum | E05F 1/1276 |
| | | | | 312/319.2 |

FOREIGN PATENT DOCUMENTS

| | | |
|---|---|---|
| CN | 203334848 | 12/2013 |
| DE | 102 03 269 | 8/2003 |
| DE | 10 2004 019 785 | 11/2005 |
| DE | 20 2010 000 096 | 4/2011 |
| DE | 20 2010 015 091 | 3/2012 |
| EP | 2 309 086 | 4/2011 |
| WO | 2009/143980 | 12/2009 |
| WO | 2010/006346 | 1/2010 |
| WO | 2011/020130 | 2/2011 |
| WO | 2011/021631 | 2/2011 |
| WO | 2013/113047 | 8/2013 |

OTHER PUBLICATIONS

Allowance Notice dated Nov. 21, 2017 in corresponding Japanese Application No. 2016-565073, with partial English translation.
International Search Report dated Jul. 10, 2015 in International (PCT) Application No. PCT/AT2015/000040.
Search Report dated Jan. 21, 2015 in Austrian Application No. A 322/2014, with English translation.

* cited by examiner

ACTUATING DRIVE FOR FURNITURE FLAPS

BACKGROUND OF THE INVENTION

The present invention concerns an actuating drive for moving a flap of an article of furniture. The actuating drive comprises a housing, an actuating arm mounted pivotably to or in the housing for moving the flap, a spring device for applying force to the actuating arm, a transmission mechanism for transmitting a force of the spring device to the actuating arm, an adjusting device by which a lever geometry of the transmission mechanism and/or the force of the spring device that acts on the actuating arm can be variably adjusted, anda damping device by which, in a damping stroke, a movement of the actuating arm can be damped with a damping power.

The invention further concerns an arrangement comprising a flap of an article of furniture and an actuating drive of the kind to be described.

WO 2013/113047 A1 to the present applicant discloses an actuating drive. The lever geometry of the actuating drive can be changed over between various operating modes by a switching device. In a first operating mode, the spring device exerts a closing force on the actuating arm in or near the closed position so that the flap which is connected to the actuating arm, towards the end of the closing movement, is also pulled into the completely closed end position. By displacement of a pivot axis (which hingedly interconnects two levers of the transmission mechanism) the actuating drive can be switched into a second operating mode in which the spring device applies to the actuating arm in the closed position a torque in the opening direction so that therefore the actuating arm already has an opening effect in the closed position. By switching over between those two operating modes, the dead point position of the actuating arm (that is to say that pivotal position of the actuating arm, in which the actuating arm is accelerated by the spring device neither in the closing direction nor in the opening direction) is also altered. For the specified situation where a damping device in the form of a run-on damper is provided for damping the closing movement of the actuating arm, a displacement of the dead point position of the actuating arm also leads to a change in the commencement of operation of the damping device. In specific terms, this means that the damping action occurs either too early or too late so that the closing movement of a flap connected to the actuating arm is not properly damped.

The object of the invention is to provide an actuating drive of the general kind set forth in the opening part of this specification, with avoidance of the above-mentioned disadvantage.

SUMMARY OF THE INVENTION

According to the invention, the above object is achieved in that the adjusting device is coupled to the damping device by a coupling device. By an adjustment of the adjusting device by way of the coupling device, the position of the damping device relative to the housing and/or the damping stroke of the damping device and/or the damping power of the damping device can be variably adjusted.

In a preferred embodiment, the damping device has a linear damper in the form of a fluid damper, with a piston-cylinder unit.

The invention is based on the notion that, by actuation of the adjusting device by way of the coupling device, at least one of the following parameters of the damping device is also adjusted, namely:

1) The position of the damping device relative to the housing of the actuating drive. In this case, the damping device can be adjusted in its entirety relative to the housing of the actuating drive, with the maximum stroke of the damping device remaining constant (FIG. 1a).
2) The maximum stroke of the damping device is limited insofar as, by actuation of the adjusting device by way of the coupling device, the length of the stroke of the damping device is also adjusted. When using a linear damper, an extension movement of a piston rod or a push rod of the linear damper can be limited by an abutment motionally coupled to the adjusting device so that in the return movement, the piston rod or the push rod can now extend only over a part of the travel of the maximum stroke. When using a rotational damper, in contrast, the rotary stroke of a rotatably mounted damping component can be limited so that this damping component can be returned only over a limited range of rotary angle of the maximum rotary stroke. By virtue of those measures, the damping travel of the damping device can be adapted to the weight of the respective furniture flap, wherein limiting the damping stroke provides that lighter furniture flaps—which require only a lesser damping stroke—can also be properly damped (FIG. 1b).
3) The damping power of the damping device is adjustable. In a first variant, it can be provided in that case that upon actuation of the adjusting device by way of the coupling device, an adjustable throttle means for the damping device is also adjusted for regulatable damping. In that way, it is possible to influence the flow rate of the damping fluid in the interior of the damping device (FIG. 1c). In that case, the damping device can have at least one passage through which the damping medium flows, wherein the flow cross-section of that passage is variably adjustable by actuation of the adjusting device by way of the coupling device. Dampers with such throttle adjusting means are already known per se, wherein so-called tooth regulation (taking out and turning the piston rod) or needle regulation (regulating screw at the front in the piston rod) can be implemented.
4) In a second variant, the damping power of the damping device is adjustable insofar as, by actuation of the adjusting device by way of the coupling device, an abutment element which is motionally coupled to the actuating arm for acting on the damping device can also be adjusted relative to the housing of the actuating drive. The respective geometry and size of the abutment element can provide that the push rod of the damping device, after contacting with the abutment element has occurred, can be pushed to a greater or lesser degree into the cylinder of the damping device, whereby the damping travel can therefore be adjusted. When a rotatably mounted abutment element is used, in addition, the angular speed of the abutment element can also be varied by adjustment of an actuating member along a guide, whereby the closing speed and thus the damping power of the damping device is also adjustable.

The coupling device for coupling between the adjusting device and the damping device can include a transmission mechanism with gears or with cooperating tooth arrangements, a mechanical lever mechanism, a cable pull and/or an electric coupling (for example with a Hall sensor for detecting an actuation of the adjusting device and with an electric motor for electric motor adjustment of the damping device).

The damping device of the actuating drive, that is coupled to the adjusting device, can be used in particular with actuating drives which include a transmission mechanism involving an adjustable lever geometry (in particular with an adjustable dead point position of the actuating arm). In that case, the actuating arm is urged by the spring device within a first range of pivotal angle in the closing direction and within a second range of pivotal angle in the opening direction. Between the first and second ranges of pivotal angle, the actuating arm has a dead point position in which the actuating arm is urged by the spring device neither in the closing direction nor in the opening direction.

In that case—as is known per se—the dead point position mechanism can have a lever mechanism (DE 102 03 269 A1), wherein the spring device exerts a closing force on the actuating arm near the closed position and, after passing beyond a dead point position—in which the joining pivots of the levers and the force vectors which are acting are disposed on one line—it exerts a torque in the opening direction. Dead point mechanisms are also known which have a control cam-pressure portion arrangement (DE 10 2004 019 785 A1) in which the control cam is of such a contour that the change of the torque acting on the actuating arm occurs after passing through a dead point position.

In that respect, the adjusting device is coupled for adjusting the dead point of the actuating arm by the coupling device to the damping device so that adjustment of the dead point of the actuating arm causes a corresponding adjustment of the operational commencement position of the damping device. In other words, upon adjustment of the dead point position of the actuating arm, the position of the damping device can also be adjusted therewith at the same time in relation to the housing of the actuating drive so that the damping device always begins to act at the respectively prevailing dead point position of the actuating arm. The damping device can have a moveably mounted actuating member for applying force to the damping device, which, towards the end of the closing movement and/or towards the end of the opening movement of the actuating arm, can be acted upon either by the actuating arm itself or by an abutment element which is motionally coupled to the actuating arm.

The damping device is preferably in the form of a linear damper with a piston-cylinder unit. The actuating member is formed by a piston rod of the linear damper, by the cylinder, or by a push rod which is either movement-coupled to the cylinder or to the piston rod. Alternatively, the damping device can also include a rotational damper, in which case the actuating member is formed by a toothed rack which is in engagement with a rotatably mounted pinion.

In one embodiment, the position of the dead point of the actuating arm—starting from the completely closed position of the actuating arm—is adjustable variably between 10° and 30°, preferably between 15° and 25°, by the adjusting device.

BRIEF DESCRIPTION OF THE DRAWINGS

Further details and advantages of the present invention will be described hereinafter by means of the embodiments illustrated in the Figures in which.

DETAILED DESCRIPTION OF THE INVENTION

Figure 1A:
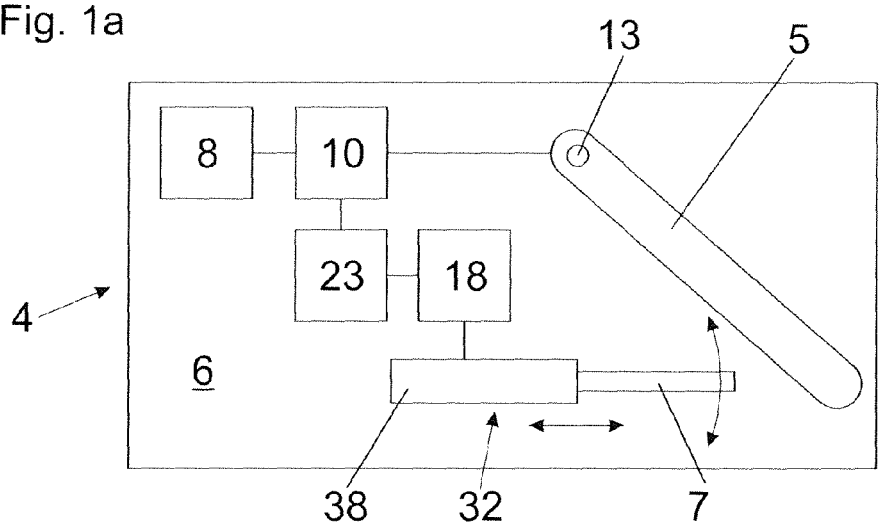
FIGS. 1a-1c show greatly diagrammatic views of an actuating drive, wherein the position of the damping device relative to the housing, the damping stroke of the damping device, and/or the damping power of the damping device is variably adjustable by actuation of the adjusting device by a coupling device.
Figure 1B:
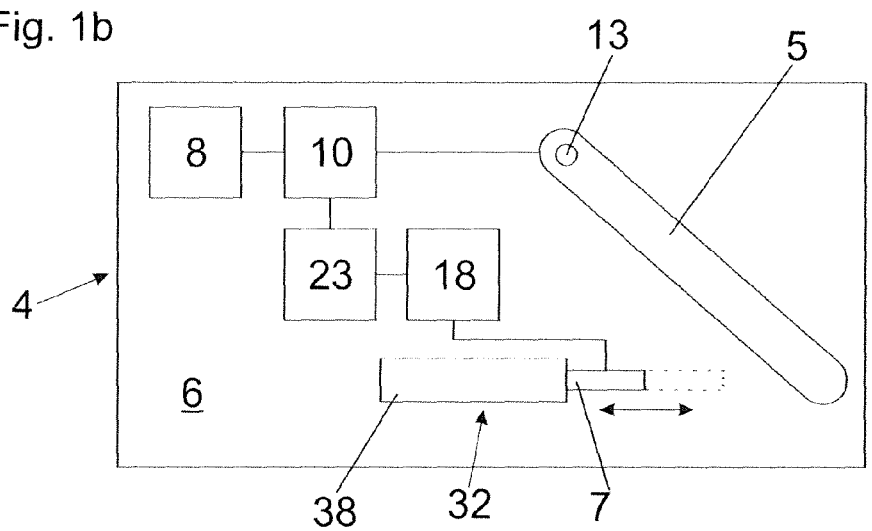
Figure 1C:
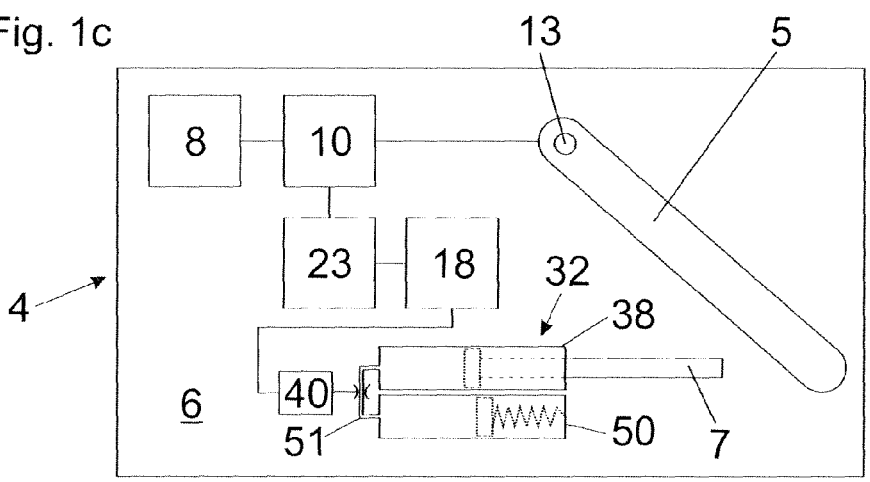

FIGS. 1a-1c show highly diagrammatic views of three different embodiments of an actuating drive 4. The actuating drives 4 each have a housing 6, an actuating arm 5 for moving a furniture flap 3 (not shown here), the actuating arm 5 being mounted in or to the housing 6 pivotably about an axis of rotation 13 which preferably extends horizontally in the mounted position, a spring device 8 for applying force to the actuating arm 5, a transmission mechanism 10 for transmitting a force of the spring device 8 to the actuating arm 5, an adjusting device 23 for adjusting a lever geometry of the transmission mechanism 10 and/or for adjusting a force of the spring device 8 acting on the actuating arm 5, as well as a damping device 32 for damping a movement of the actuating arm 5. In the illustrated embodiments, the damping device 32 is in each case in the form of a linear damper with a piston-cylinder unit. Towards the end of the closing movement, the actuating arm 5 encounters the push rod 7 of the damping device 32, whereupon the retraction movement of a push rod 7 relative to the cylinder 38 can be damped against the resistance of a damping fluid. The adjusting device 23 is coupled in each case to the damping device 32 by a coupling device 18 so that, as shown in FIG. 1a, by adjustment of the adjusting device 23, the damping device 32 is displaceable and/or pivotable in its entirety relative to the housing 6 of the actuating drive 4 in the direction of the two double-headed arrows shown. In that way, it is possible to adjust the impingement point of the actuating arm 5 relative to the push rod 7.

FIG. 1b shows the actuating drive 4, with the adjusting device 23 cooperating via the coupling device 18 with the linearly displaceable push rod 7 of the damping device 32. In that case, an extension movement of the push rod 7 relative to the cylinder 38 can be limited by an abutment motionally coupled to the adjusting device 23 so that the piston rod 41 (FIG. 3) or the push rod 7 in the return movement can extend only over a part of the maximum stroke. Limiting the extension movement of the push rod 7 provides a reduced damping stroke, whereby lighter furniture flaps 3 can more quickly move into the closed end position, by virtue of the reduced damping travel.

FIG. 1c shows the actuating drive 4, wherein the adjusting device 23 can be coupled by way of the coupling device 18 to an adjustable throttle 40 of the damping device 32. By actuation of the adjusting device 23, the adjustable throttle 40 of the damping device 32 can also be adjusted via the coupling device 18 for regulating the flow rate of the damping fluid. In the illustrated embodiment, in the damping stroke the hydraulic damping medium in the cylinder 38 is urged by a movement of the piston connected to the push rod 7 into a passage 51 which, starting from the cylinder 38, leads to a compensation container 50 with a spring-loaded compensation piston disposed therein. The flow cross-section of that passage 51 can be varied by the throttle 40 which is actuable via the coupling device 18, such variation being provided for example by a disk which is in motionally coupled engaging relationship with an adjusting element (for example an eccentric) actuable by the coupling device 18, for adjustment of that disk.

Figure 2A:
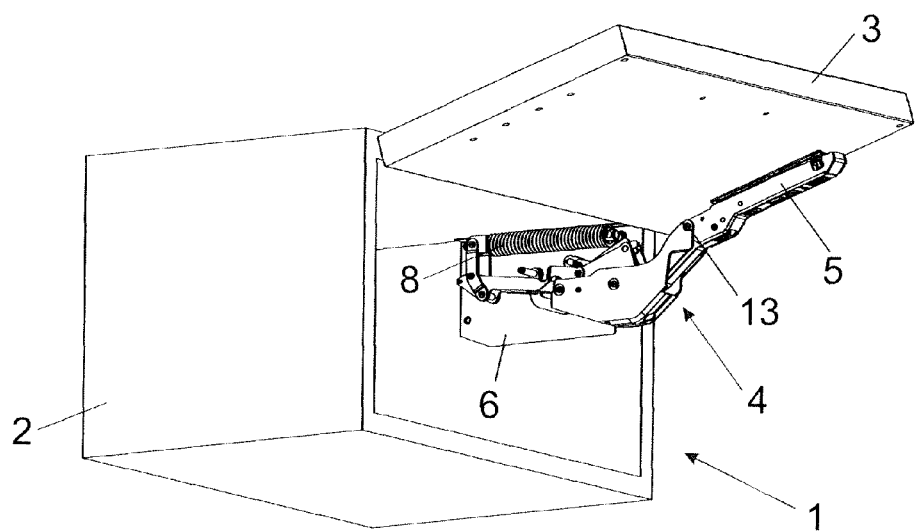
FIGS. 2a, 2b show a perspective view of an article of furniture having a furniture carcass and a flap which is moveable upwardly relative thereto and which is mounted moveably by way of actuating drives, and a perspective view of an actuating drive.

FIG. 2a shows an article of furniture 1 comprising a furniture carcass 2 and a flap 3 which is moveable upwardly relative thereto and which is mounted moveably by way of an actuating drive 4. The actuating drive 4 has a housing 6 and an actuating arm 5 which is mounted rotatably to or in the housing 6 and which is acted upon by a spring device 8, and which is mounted pivotably about a horizontally extending axis of rotation 13 in the mounted position and is connected to the flap 3 in the mounted position. Starting from a vertical closed position, the flap 3 is moveable by the actuating drive 4 into an open position above the furniture carcass 2.

Figure 2B:
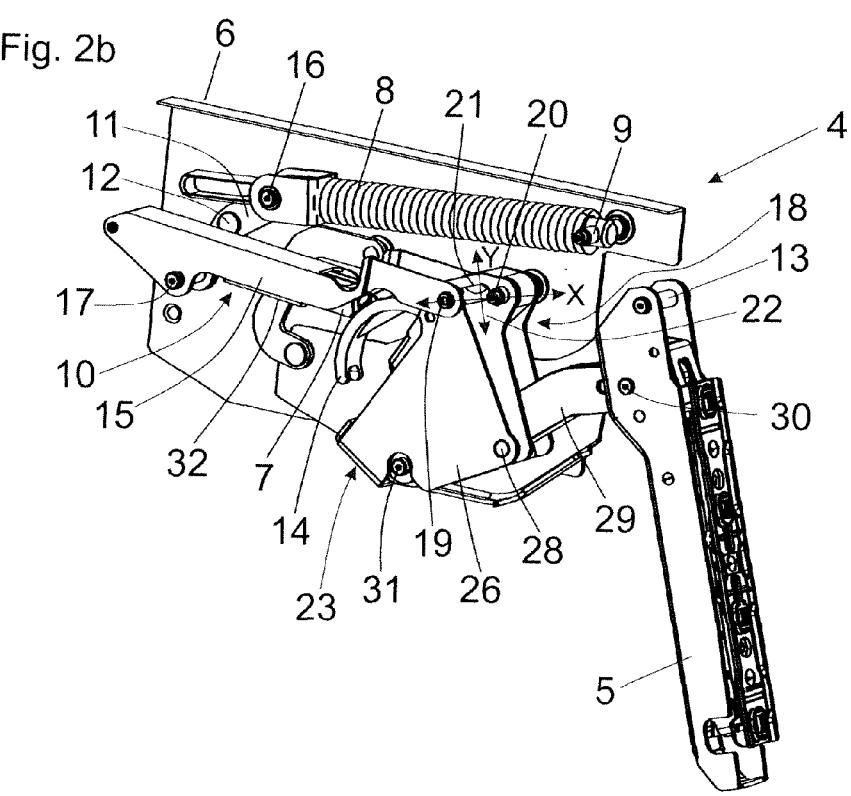

FIG. 2b shows a perspective view of a possible embodiment of an actuating drive 4. The housing 6 to be fixed to the furniture carcass 2 includes a spring device 8 (preferably with one or more compression springs) which is supported with an end region on a stationary spring base 9 on the housing 6. Provided for the transmission of a force from the spring device 8 to the actuating arm 5 which is mounted pivotably about the axis of rotation 13, there is a transmission mechanism 10 which includes a double-arm deflection lever 11 having two lever ends, which is mounted pivotably about a stationary axis of rotation 12. A first lever end of the double-arm lever 11 is connected by a first joint 16 to the spring device 8, and a second lever end of the lever 11 is connected by a second joint 17 to a thrust lever 15. An adjustable actuating member 19 is mounted at an end of the thrust lever 15 remote from the joint 17. In addition, there is a coupling device 18 which couples together the spring device 8, the axis of rotation 13 of the actuating arm 5, the actuating member 19, and an abutment element 14 motionally coupled to the actuating arm 5 for acting on a damping device 32. In the illustrated embodiment, the damping device 32 is mounted to the thrust lever 15 which is moveable relative to the housing 6, and the damping device 32 includes a linearly displaceable push rod 7 which is acted upon towards the end of the closing movement of the actuating arm 5 by the abutment element 14 connected to the actuating arm 5 in motionally coupled relationship. The position of the actuating member 19 in or on the, preferably curved, guide 21 is displaceable in a direction towards to and away from the pivot axis 20 of the lever 22 by the adjusting device 23, in which case the relative spacing between the actuating member 19 and the pivot axis 20 of the lever 22 can be reduced and increased in size along a notional connecting line between the actuating member 19 and the pivot axis 20 of the lever 22, in the direction (X). The torque of the spring device 8, that acts on the actuating arm 5 in the opening direction, is adjustable by adjustment of the actuating member 19 in the direction (X). In addition, the position of the actuating member 19 in or on the guide 21 is adjustable in a direction (Y) extending transversely relative to the notional connecting line by the adjusting device 23, whereby the dead point position of the actuating arm 5 is variably adjustable. By suitable selection of the gradient or curvature of the guide 21, it is possible to determine the extent to which adjustment of the dead point position and the adjustment of the spring force acting in the opening direction are implemented. Therefore, the position of the damping device 32 relative to the housing 6 of the actuating drive 4 is variably adjustable by the adjusting device 23, in which case the damping device 32 can be mounted either directly to the housing 6, to a portion moveable relative to the housing 6 (for example the thrust lever 15), or also separately from the housing 6.

In the illustrated embodiment, the coupling device 18 has a lever 22 which is mounted about a stationary pivot axis 20 and has a guide 21. The position of the actuating member 19 is adjustable in or along that guide 21 by a single adjusting device 23 (not shown in detail here) so that, by adjustment of the actuating member 19 in or on that guide 21, both the position of the dead point of the actuating arm 5, an operational commencement position of the damping device 32 corresponding thereto, and also the force of the spring device 8 acting in the opening direction on the actuating arm 5 can be adjusted at the same time. In the illustrated Figure, the position of the actuating member 19 is a position remote in relation to the stationary pivot axis 20 of the lever 22 so that the force arm formed between the pivot axis 20 and the actuating member 19 is relatively great. Thus, the torque acting on the actuating arm 5 in the opening direction is set to its maximum. That setting of the actuating member 19 relative to the guide 21 is used for moving heavy furniture flaps 3.

Figure 3:
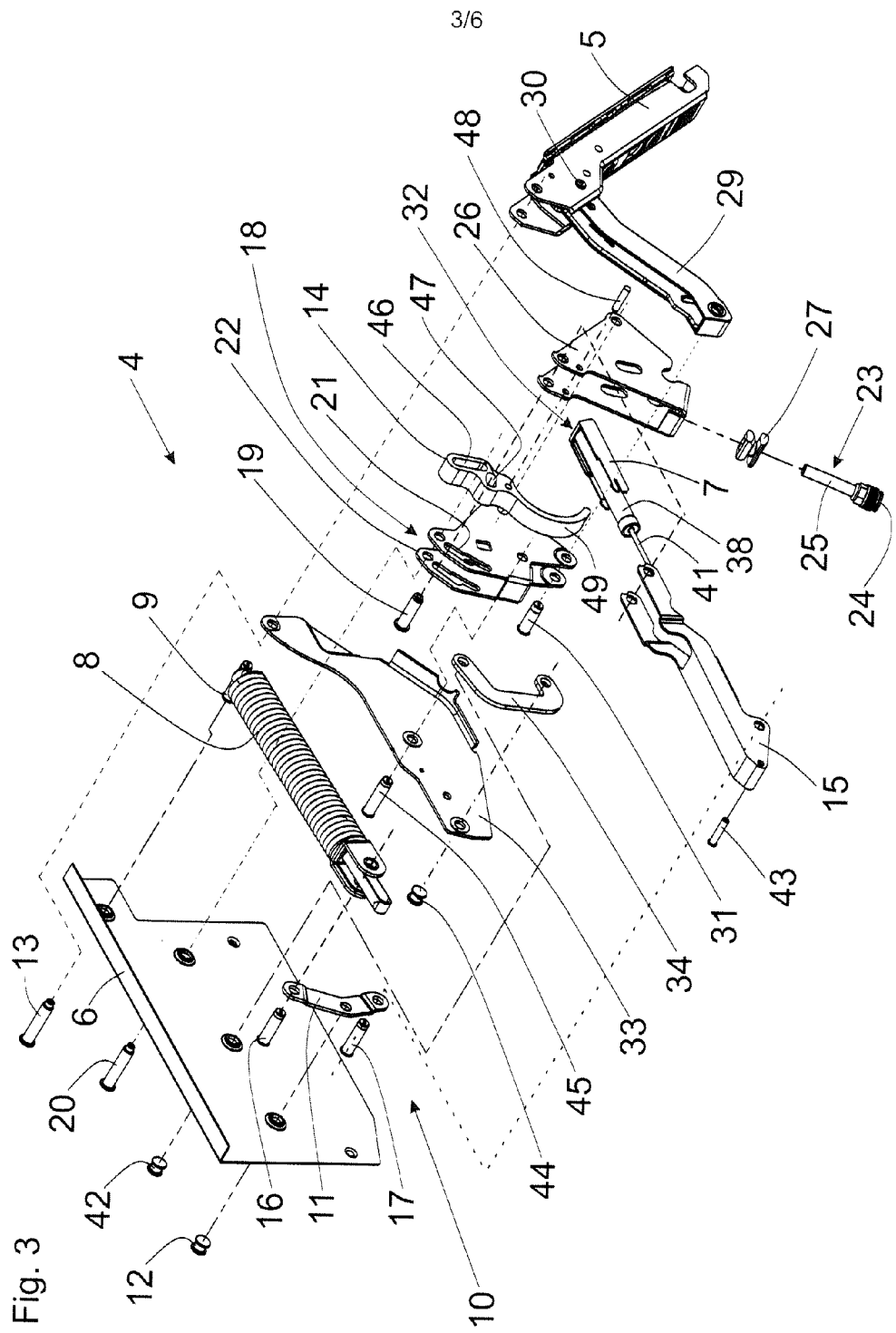
FIG. 3 shows an exploded view of the actuating drive shown in FIG. 2b.

FIG. 3 shows an exploded view of the actuating drive 4 of FIG. 2b. The spring device 8 is supported on the housing 6 at a spring base 9 stationarily but hingedly. The transmission mechanism 10 includes a double-arm deflection lever 11 which is mounted pivotably about a stationary pivot axis 12, having two lever ends. A first lever end is hingedly connected by a first joint 16 to the spring device 8, and a second lever end is hingedly connected by a second joint 17 to a thrust lever 15. The damping device 32 in the form of the piston-cylinder unit is mounted to that thrust lever 15, the cylinder 38 of the linear damper is accommodated within a U-shaped portion of the thrust lever 15, and the free end of the piston rod 41 is supported against an abutment 43 connected to the thrust lever 15. Connected to the cylinder 38 is a push rod 7 which in the closing movement of the actuating arm 5 can be acted upon by an abutment element 14 motionally coupled to the actuating arm 5, preferably by a curved portion 49 thereof. The thrust lever 15 is hingedly connected to a pivotable adjustment lever 26, a first slot 47 in the abutment element 14 and to the pivotable lever 22, more specifically by way of the actuating member 19 which is mounted displaceably by the adjusting device 23 along the guide 21 of the lever 22. The adjustment lever 26 is pivotably connected to the abutment element 14 by a pivot axis 48. The lever 22 is mounted pivotably about a stationary pivot axis 20 arranged on a housing 6, and the pivot axis 20 also passes through a second slot 46 in the abutment element 14. The intermediate lever 29 is connected to the actuating arm 5 by a joint 30, and the other end of the intermediate lever 29 is connected to the pivotable lever 22 by the pivot axis 31 which moves relative to the housing 6. The lever 22 is connected by a moving pivot axis 45 to an elongate main lever 33 connected to a pivot lever 34 by a pivot axis 44. The pivot lever 34 is mounted pivotably to the housing 6 at a stationary pivot axis 42.

The adjusting device 23 has an adjustment wheel 24 which is mounted rotatably to the adjustment lever 26 and has a receiving element for an actuating tool, the position of the actuating member 19 along the guide 17 being adjustable by rotation of the receiving element by the actuating tool. By rotating the adjustment wheel 24, it is possible to rotate a threaded portion 25 which is in threaded engagement with a thread receiving element 27 on the lever 22. By rotation of the adjustment wheel 24, the threaded portion 25 is also rotated so that the thread receiving element 27 (and thus the lever 22 connected thereto) is moveable in a direction towards and away from the adjustment wheel 24. In that way, the inclination of the adjustment lever 26 relative to the lever 22 mounted about the stationary pivot axis 20 is adjustable, in which case the position of the actuating member 19 along the guide 21 of the lever 22 also changes. Because of the fact that both the abutment element 14 and the thrust lever 15 (with the damping device 32 mounted thereon) act on the actuating member 19, an adjustment of the actuating member 19 along the guide 21 also leads to a change in the position of the damping device 32 with respect to the housing 6 and also a change in the position of the abutment element 14.

Figure 4:
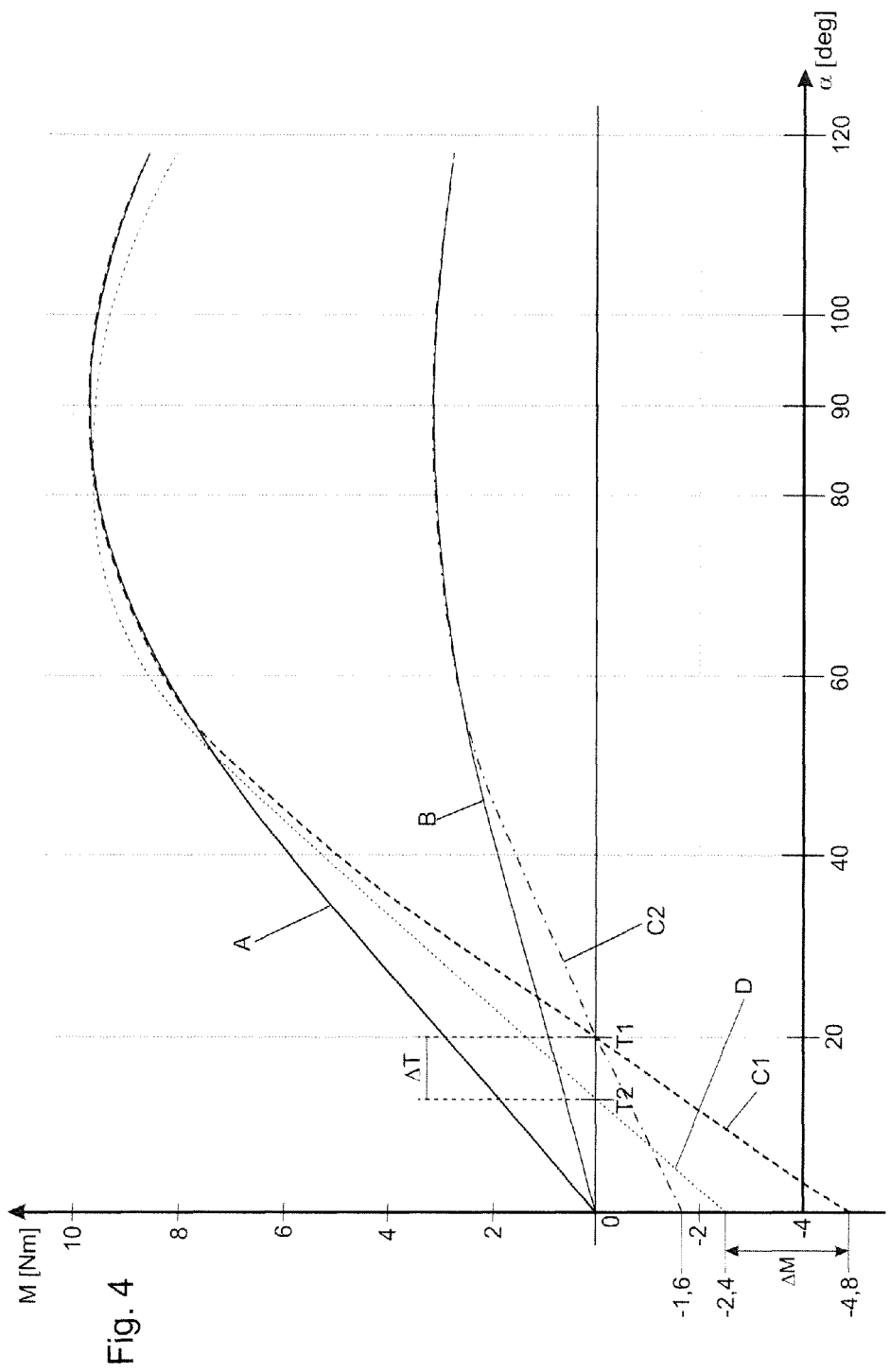
FIG. 4 shows a graph illustrating the variations in torque based on the opening angle of the flap.

FIG. 4 shows a graph illustrating the variations in torque (torque M in Newton meters, Nm) depending on the opening angle (in degrees, α) of the flap 3 of an article of furniture 1. The curve A shows the (theoretical) configuration of the torque applied in relation to the angular position of the flap 3, that is to be applied by the actuating drive 4. The flap 3 is not accelerated by the actuating drive 4 either in the opening direction or in the closing direction, and is thus held in a balanced condition. That curve A corresponds to the maximum setting of the torque in the opening direction, which therefore is to be provided in the case of heavy furniture flaps 3. Starting from 0° opening angle of the flap 3, it is opened over a range of opening angles, the maximum of the curve A occurring at about 90° opening angle of the flap 3. At the 90° opening angle of the flap 3, more specifically, the actuating drive 4 must provide the highest torque so that the flap 3 is automatically held in that position by the force of the spring device 8.

The curve B shows the (theoretical) configuration of the torque applied in relation to the angular position of the flap 3, that is to be applied by the actuating drive 4. The flap 3 is not accelerated by the actuating drive 4 either in the opening direction or in the closing direction and is thus held in a balanced condition. That curve B corresponds to the minimum setting of the torque in the opening direction, which is therefore to be provided in the case of light furniture flaps 3. The maximum of that curve B also occurs at a 90° opening angle of the flap 3, in which case the torque provided by the actuating drive 4 is less in the opening direction than that shown by the curve A.

The curve C1 shows the configuration of the torque exerted by the actuating drive 4 on the actuating arm 5 and thus on the flap 3. That curve corresponds to the maximum setting of the torque in the opening direction (when using heavy furniture flaps 3), in which case, for large angular positions—without having regard to friction—an approximation to the curve A is attained from about the 40° open position of the flap 3. In the completely closed position (at 0° opening angle), a negative force is exerted on the flap 3 so that the flap 3 is held in the closed end position with a retaining force. After passing through the dead point position T1, the flap 3 is acted upon in the opening direction with a high level of torque. When the flap 3 is closed again, a high retaining force (−4.8 Nm) is also exerted on the flap 3 by the actuating drive 4 after passing through the dead point position T1 by virtue of the high level of torque in the opening direction. That high retaining force has to be overcome on each occasion by a user by forcibly pulling on the flap 3.

The curve C2 shows the configuration of the torque exerted by the actuating drive 4 on the actuating arm 5 and thus on the flap 3, with the minimum setting of the torque acting in the opening direction, which is therefore to be provided when dealing with light furniture flaps 3. That low torque in the opening direction, after passing through the dead point position T1, also leads to a lower retaining force (−1.6 Nm), which is to be overcome by a user when opening the flap 3 without applying a great force. It can be seen that with the setting of the minimum or maximum spring force (curve C1 and curve C2 respectively), there is a considerable difference in the retaining force (namely −4.8 Nm and −1.6 Nm), which is detrimental for that person who has to open the flap 3.

By adjusting the actuating member 19 along the guide 21, it is possible to move the position of the dead point position T1 of the actuating arm 5 further towards the closed position to dead point T2. The curve D shows the configuration of the torque of the actuating drive 4 at the spring force set at its maximum in the opening direction (that is to say when using heavy flaps 3). When now the flap 3 is closed, the actuating arm 5 passes through the dead point position T2, in which case due to the displaced position of the dead point T2 it can also be directly seen from the graph that the retaining force at the 0° opening angle of the flap 3 (but also with an equal torque in the opening direction as the curve C1) is considerably reduced by the force difference ΔM (−2.4 Nm instead of −4.8 Nm, that is to say by half). Thus, a displaced position of the dead point, starting from the dead point T1 to the dead point T2, brings about a phase shift in the torque configuration (curve D instead of curve C1) by an amount ΔT so that in the closed position of the flap (at 0° opening angle of the flap 3), even with a high level of torque in the opening direction, there is a low retaining force which can be overcome without any problem by a person when opening the flap 3. That phase shift in the curves C1, D by the amount ΔT is also clearly visible at the 90° opening angle of the flap 3.

Figure 5A:
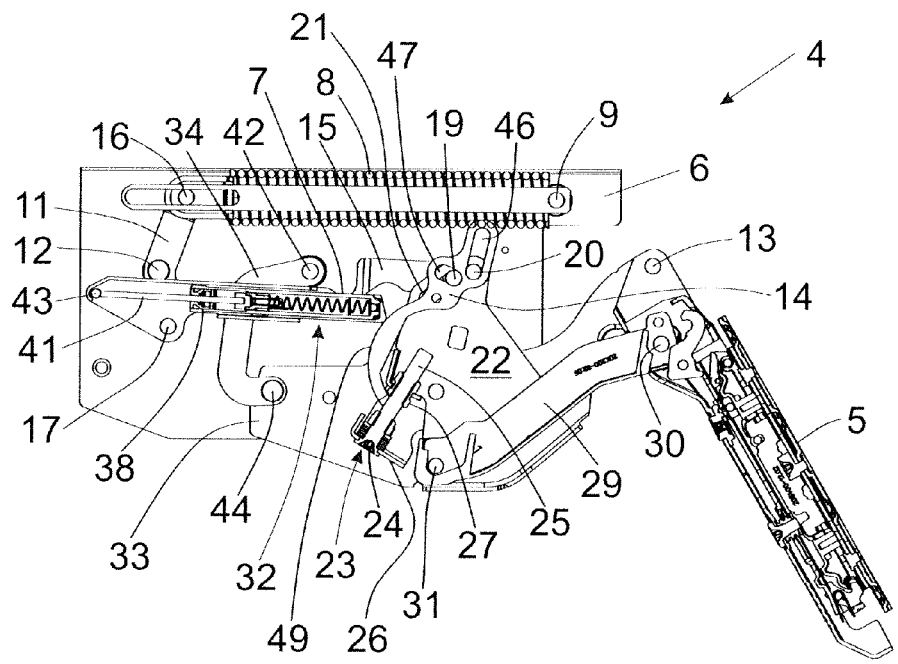
FIGS. 5a, 5b show a cross-section of the actuating drive with two mutually different adjustments of an actuating member relative to a guide.
Figure 5B:
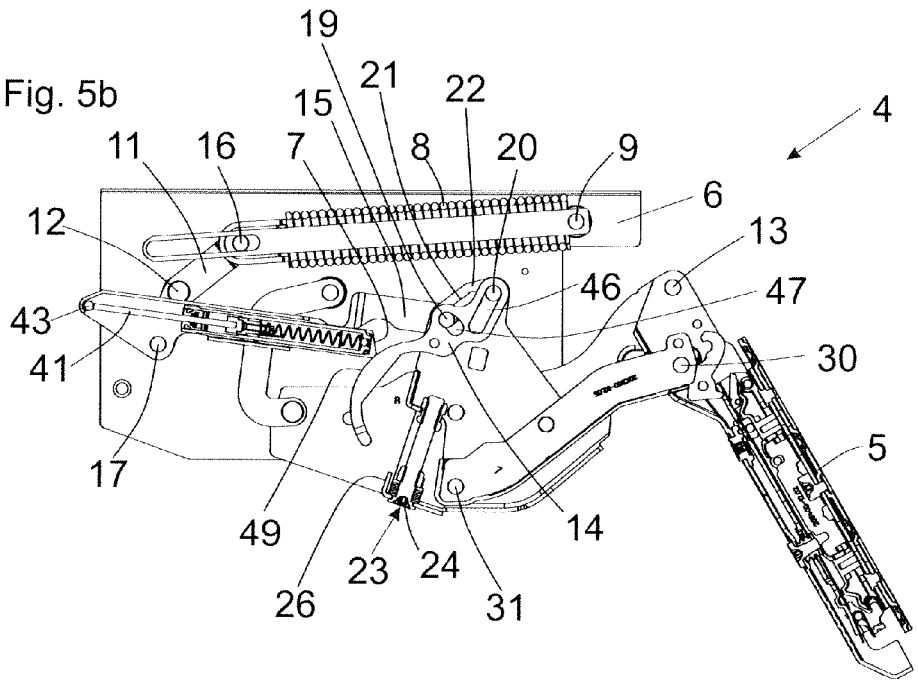

FIGS. 5a and 5b show the actuating drive 4 with two different settings of the actuating member 19 relative to the guide 21, the damping device 32 being disposed in each case in an operational commencement position (that is to say at the beginning of the damping stroke). In FIG. 5a, the displaceable actuating member 19 relative to the guide 21 is in a position adjacent in relation to the stationary pivot axis 20 of the lever 22 so that the force arm formed between the stationary pivot axis 20 and the displaceable actuating member 19 is small. Consequently, the torque acting on the actuating arm 5 in the opening direction is also set at a minimum. That setting of the actuating member 19 relative to the guide 21 is consequently used for moving light furniture flaps 3 and corresponds to the curve C2 shown in FIG. 4.

In FIG. 5b in contrast, due to rotation of the adjustment wheel 24, the actuating member 19 has been moved relative to the guide 21 into a position which is remote in relation to the stationary pivot axis 20 so that the lever arm formed between the pivot axis 20 and the displaceable actuating member 19 is large. Consequently, the torque acting on the actuating arm 5 in the opening direction is also set at a maximum. It is to be noted that, due to displacement of the actuating member 19 along the guide 21, the position of the damping device 32 is also displaceable in relation to the housing 6 so that the commencement of damping always takes place at the same pivotal position of the actuating arm 5 (at about 30° opening angle of the actuating arm 5). In addition, with an adjustment of the position of the actuating member 19, the abutment element 14 is also adjustable with the curved portion 49 provided thereon whereby the damping travel and the closing speed of the damping device 32 is variably adjustable. When dealing with large or heavy furniture flaps 3, the setting of the actuating member 19 shown in FIG. 5b is employed, in which case the abutment element 14—by virtue of the larger spacing between the stationary pivot axis 20 and the adjustable actuating member 19—involves a higher angular speed than at the minimum torque setting as shown in FIG. 5a, and the push rod 7 of the damping device 32 is pushed in further and thus the damping travel is increased. In that way, the damping power can be adapted to the respective weight of the furniture flap 3.

Figure 6A:
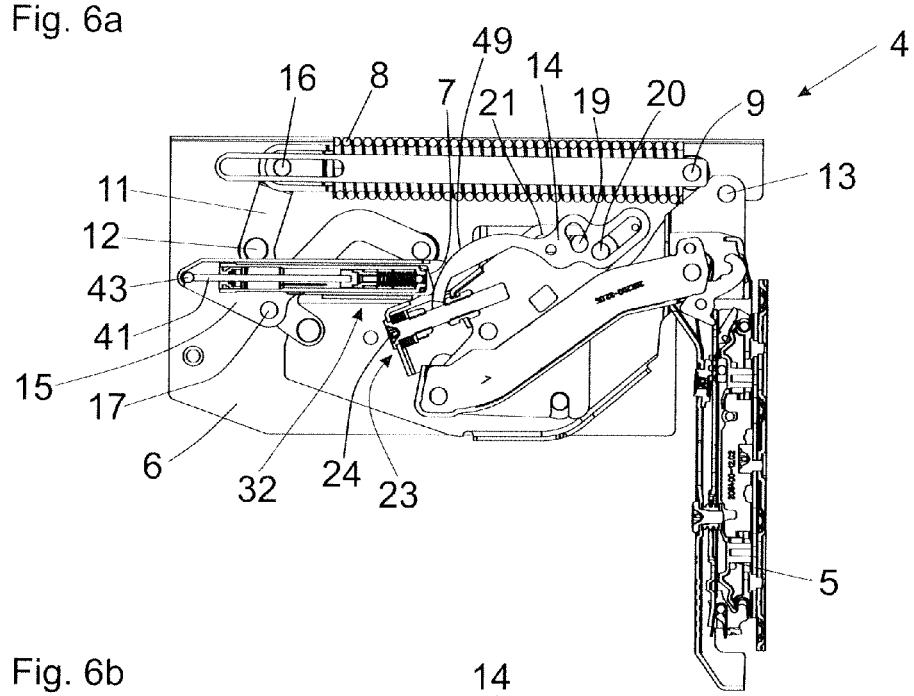
FIGS. 6a, 6b show the actuating drive with the differing settings of the actuating member as shown in FIGS. 5a and 5b, with the actuating arm being respectively disposed in the completely closed end position.

FIG. 6a shows the actuating drive 4 with the minimum force setting as shown in FIG. 5a, wherein the actuating arm 5 is in the closed position and the damping device 32 is at the end of the damping stroke. Towards the end of the closing movement, the curved portion 49 of the abutment element 14 meets the push rod 7 of the damping device 32, in which case the cylinder 38 of the linear damper is displaced relative to the stationary piston rod 41—which is supported at the thrust lever 15 on the abutment 43—and thus the closing movement of the actuating arm 5 can be damped.

Figure 6B:
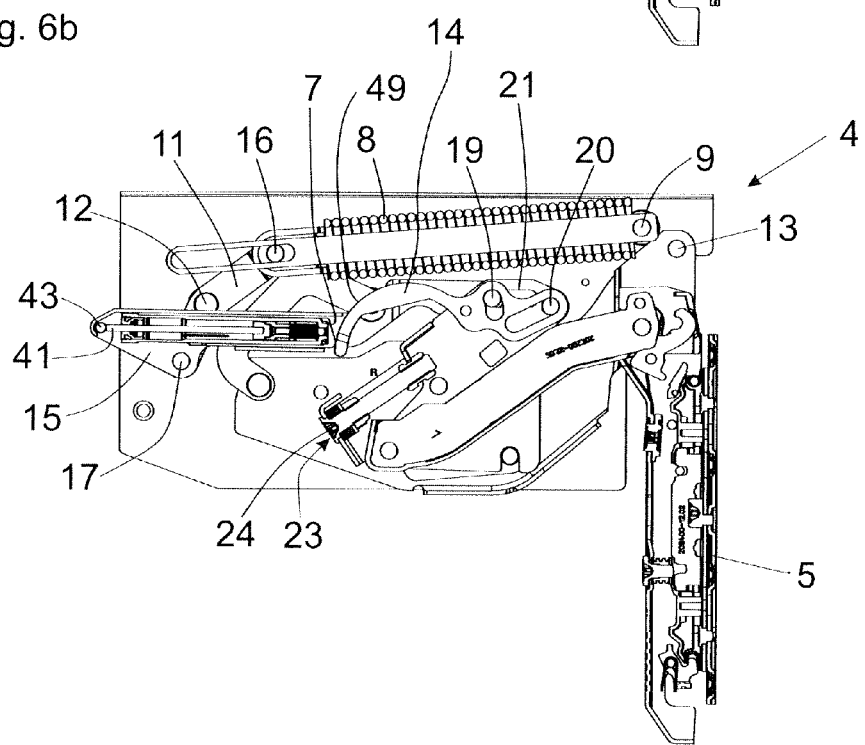

FIG. 6b, in contrast, shows the actuating drive 4 at the maximum force setting acting on the actuating arm 5 as shown in FIG. 5b. The actuating arm 5 is in the closed position, and the damping device 32 is at the end of the damping stroke. It will be seen that—in comparison with FIG. 6a —the push rod 7 is pushed further in and the free end of the abutment element 14 bears against the push rod 7. Due to displacement of the actuating member 19 along the guide 21, the abutment element 14, in the closing movement of the actuating arm 5, is moved at a higher angular speed in comparison with the setting of the actuating member 19 as shown in FIG. 6a so that the push rod 7 of the damping device 32 (and therefore the linear movement between the piston and the cylinder of the damping device 32) is also moved at a higher closing speed. The abutment element 14 provided for acting on the damping device 32 has a first slot 47 and a second slot 46 (FIG. 3). The displaceable actuating member 19 engages in the first slot 47, and the stationary pivot axis 20 engages in the second slot 46. Actuation of the adjusting device 23 by way of the coupling device 18 provides that the spacing formed between the pivot axis 20 and the actuating member 19, and thus the angular speed of the abutment element 14 which is motionally coupled to the actuating arm 5, is variably adjustable.

It is to be noted that the damping device 32 does not necessarily have to be arranged in or on the housing 6 of the actuating drive 4. Rather, it is also possible for the flap 3 to have a first side edge which is mounted pivotably about an axis of rotation in relation to the furniture carcass 2 and for the flap 3 to have a second side edge in parallel spaced relationship from the first side edge. In that case, the damping device 32 coupled to the adjusting device 23 by the coupling device 18 is fixed to the furniture carcass 2 and, towards the end of the closing movement of the flap 3, can be acted upon by a region of the flap 3 adjacent to the second side edge of the flap 3 and is remote from the axis of rotation of the flap 3.

The invention claimed is:

1. An actuating drive for moving a flap of an article of furniture, said actuating drive comprising:
   a housing;
   an actuating arm mounted pivotably to or in the housing for moving the flap;
   a spring device for applying force to the actuating arm;
   a transmission mechanism for transmitting a force of the spring device to the actuating arm;
   an adjusting device by which a lever geometry of the transmission mechanism and/or the force of the spring device acting on the actuating arm can be variably adjusted; and
   a damping device configured to damp a movement of the actuating arm with a damping power in a damping stroke;
   wherein the adjusting device is coupled to the damping device by a coupling device, such that, by an adjustment of the adjusting device via the coupling device, a position of the damping device relative to the housing and/or the damping stroke of the damping device and/or the damping power of the damping device can be variably adjusted;
   wherein the spring device is configured to urge the actuating arm in the closing direction within a first range of pivotal angle and in the opening direction within a second range of pivotal angle, and the actuating arm has a dead point position between the first range and the second range of pivotal angle in which the actuating arm is urged by the spring device neither in the closing direction nor in the opening direction, the dead point position of the actuating arm being variably adjustable by the adjusting device;
   wherein, starting from an operational commencement position of the actuating arm, the damping device damps a movement of the actuating arm, and by adjustment of the dead point position of the actuating arm by the coupling device, a corresponding displacement of the operational commencement position of the damping device is effected.

2. The actuating drive according to claim 1, wherein the adjusting device has a displaceable actuating member, wherein both the dead point position of the actuating arm and/or the operational commencement position of the damping device and/or the force of the spring device acting in the opening direction on the actuating arm is variably adjustable by displacement of the actuating member in or along a guide.

3. The actuating drive according to claim 2, wherein the coupling device has a lever mounted rotatably about a pivot axis, wherein the guide is arranged or provided on the lever.

4. The actuating drive according to claim 3, wherein the position of the actuating member is displaceable in or on the guide in the direction towards and away from the pivot axis of the lever, and the relative spacing between the actuating member and the pivot axis of the lever can be reduced and increased in a direction along a notional connecting line between the actuating member and the pivot axis of the lever.

5. The actuating drive according to claim 4, wherein the position of the actuating member is adjustable by the adjusting device in or at the guide in a direction extending transversely to the notional connecting line.

6. The actuating drive according to claim 2, wherein the adjustable device has an adjustment wheel, and the position of the actuating member in or at the guide is adjustable by rotation of the adjustment wheel.

7. The actuating drive according to claim 1, wherein the damping device has a moveably mounted actuating element for applying a force to the damping device, and the actuating element of the damping device is to be acted upon by an abutment element motionally coupled to the actuating arm.

8. The actuating drive according to claim 7, wherein the actuating element of the damping device is a push rod mounted linearly displaceably relative to a cylinder of the damping device.

9. The actuating drive according to claim 7, wherein the abutment element motionally coupled to the actuating arm is a pivotably mounted lever.

10. The actuating drive according to claim 9, wherein the lever has a curved portion for acting on the damping device.

11. The actuating drive according to claim 1, wherein the damping device has a linear fluid damper.

12. An arrangement comprising:
   a flap of an article of furniture; and
   the actuating drive according to claim 1, wherein the flap is moveable by the actuating drive, starting from a vertical closed position, into an open position above a furniture carcass.

* * * * *